United States Patent
Haverkamp Begemann

(10) Patent No.: US 10,110,964 B2
(45) Date of Patent: *Oct. 23, 2018

(54) MULTIMEDIA SYSTEM AND METHOD OF PERFORMING A PLAYBACK BY MEANS OF A MULTIMEDIA SYSTEM

(71) Applicant: Harman International Industries, Incorporated, Stamford, CT (US)

(72) Inventor: Bob Haverkamp Begemann, Amsterdam (NL)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,154

(22) Filed: Feb. 3, 2016

(65) Prior Publication Data

US 2016/0156977 A1   Jun. 2, 2016

Related U.S. Application Data

(63) Continuation of application No. 13/839,716, filed on Mar. 15, 2013, now Pat. No. 9,264,687.

(30) Foreign Application Priority Data

Apr. 18, 2012 (EP) .................................. 12164548

(51) Int. Cl.
*H04N 21/475* (2011.01)
*H04N 21/2543* (2011.01)
(Continued)

(52) U.S. Cl.
CPC .......... *H04N 21/4753* (2013.01); *H04N 9/87* (2013.01); *H04N 21/2543* (2013.01);
(Continued)

(58) Field of Classification Search
CPC .. H04N 21/4753; H04N 9/87; H04N 21/2543; H04N 21/25875;
(Continued)

(56) References Cited

U.S. PATENT DOCUMENTS

2001/0046366 A1* 11/2001 Susskind ................ H04N 5/782
386/234
2006/0083482 A1* 4/2006 Arora ................... G11B 27/034
386/241

(Continued)

FOREIGN PATENT DOCUMENTS

EP          1622371 A1    2/2006
WO       2006020560 A2    2/2006

OTHER PUBLICATIONS

European Office Action for corresponding Application No. 12 164 548.5-1905, dated May 23, 2016, 8 pages.

(Continued)

*Primary Examiner* — Hung Dang
*Assistant Examiner* — Sunghyoun Park
(74) *Attorney, Agent, or Firm* — Brooks Kushman P.C.

(57) ABSTRACT

Various embodiments relate to a multimedia system comprising a plurality of multimedia sources and a playback unit being configured to perform a requested playback. The multimedia system comprising a control unit configured to automatically extract at least portions of the playback as tracks. The tracks being characteristic audio and/or video parts of the playback. The multimedia system further comprises a communication interface being configured to connect to the Internet and to automatically send first data comprising the tracks to a remote server and further being configured to automatically receive second data in response to the sent first data from the remote server. The second data comprises identification information of the playback. The (Continued)

identification information being determined based on the tracks and uniquely identifying the playback.

10 Claims, 4 Drawing Sheets

(51) Int. Cl.
    *H04N 21/258*     (2011.01)
    *H04N 21/4415*     (2011.01)
    *H04N 21/442*     (2011.01)
    *H04N 21/6334*     (2011.01)
    *H04N 21/658*     (2011.01)
    *H04N 21/8352*     (2011.01)
    *H04N 9/87*     (2006.01)

(52) U.S. Cl.
    CPC . *H04N 21/25875* (2013.01); *H04N 21/25891* (2013.01); *H04N 21/4415* (2013.01); *H04N 21/44222* (2013.01); *H04N 21/6334* (2013.01); *H04N 21/6582* (2013.01); *H04N 21/8352* (2013.01)

(58) Field of Classification Search
    CPC ......... H04N 21/25891; H04N 21/4415; H04N 21/44222; H04N 21/6334; H04N 21/6582; H04N 21/8352
    See application file for complete search history.

(56) References Cited

U.S. PATENT DOCUMENTS

| | | |
|---|---|---|
| 2006/0184961 A1 | 8/2006 | Lee et al. |
| 2007/0124796 A1* | 5/2007 | Wittkotter .......... H04N 7/17309 725/136 |
| 2007/0250848 A1* | 10/2007 | Gorti ...................... H04H 20/38 725/14 |
| 2010/0262986 A1 | 10/2010 | Adimatyam et al. |
| 2012/0029670 A1 | 2/2012 | Mont-Reynaud et al. |
| 2012/0311074 A1* | 12/2012 | Arini ................ H04N 21/23109 709/217 |
| 2013/0160038 A1* | 6/2013 | Slaney ................. H04N 21/233 725/14 |

OTHER PUBLICATIONS

European Search Report for Application No. 12164548.5, dated Sep. 6, 2012, 8 pages.
U.S. Office Action for corresponding U.S. Appl. No. 13/839,716, dated May 21, 2015, 21 pages.
Wang, "An Industrial-Strength Audio Search Algorithm", Shazam Entertainment, 2003, 7 pages.

* cited by examiner

MULTIMEDIA SYSTEM AND METHOD OF PERFORMING A PLAYBACK BY MEANS OF A MULTIMEDIA SYSTEM

CROSS-REFERENCE TO RELATED APPLICATIONS

This application is a continuation of U.S. application Ser. No. 13/839,716 filed Mar. 15, 2013, which, in turn, claims priority to EP Application No. 12 164 548.5 filed on Apr. 18, 2012, the disclosures of which are incorporated in their entirety by reference herein.

TECHNICAL FIELD

Various embodiments relate to a multimedia system and to a method of performing a playback with the multimedia system. More particular, various embodiments relate to techniques for uniquely identifying the playback.

BACKGROUND

Multimedia systems, such as in-car entertainment systems or audio-video-receivers (AVRs), are known which comprise a plurality of multimedia sources for a playback. In particular, the multimedia sources comprised in the multimedia system can be of different nature in view of the playback.

Namely, on the one hand, conventional multimedia sources are known which provide a predefined and possibly prerecorded stream of multimedia data to a user. The user does not have the possibility to individually select multimedia data for the playback. The user may only choose the playback of the multimedia source. Such multimedia sources can be analog radio, digital radio, analog and digital television, internet live-streams, Internet radio, etc.

On the other hand, multimedia sources are known which allow for individually requesting the playback of certain multimedia data. The user may specifically select the certain multimedia data for the playback. For example, such multimedia sources comprise local storage units, remote storage units being connected via a remote storage interface connecting (e.g., to the Internet, or a compact disk or Blu-ray disk with individual songs/chapters etc.).

As noted above, one way to classify different types of the multimedia sources is to distinguish between the providing of individual multimedia data or the providing of predefined streams of the multimedia data. Another way of distinguishing and classifying different multimedia sources is to differentiate between analog and digital multimedia sources. For example, a commonly employed and widely popular multimedia sources is the frequency modulated (FM) radio in the wave band of roughly 88.0 to 108.0 MHz. FM radios typically provide a stream of analog multimedia data with no or only little additional information on the identity of the multimedia data of the current playback. Radio data service (RDS) tags commonly refer to the radio station rather than the identity of the multimedia data. Lately, digital multimedia sources have gained increasing popularity. In particular, the provisioning of audio and/or video files in a digital format on hard disc drives or on remote storages, e.g., in the Internet, has changed the multimedia consumption habits of consumers.

Current multimedia systems such as audio-video-receivers (AVR) or in-vehicle entertainment systems allow the playback of a plurality of such multimedia sources and can handle the wide variety as outlined above. While the different multimedia sources have their own characteristic standards and operation properties, recently a desire has arisen to classify and keep track of the multimedia consumption of a user independently of the type of multimedia source.

Accordingly, a need exists to provide techniques of the playback employing a plurality of multimedia sources and allowing for a unique identification of the playback independently of the type of the given multimedia source of the playback.

SUMMARY

This need is met by the independent claims. The dependent claims define embodiments.

According to an aspect, a multimedia system is provided. The multimedia system comprises a plurality of multimedia sources each being configured to provide multimedia data for a playback. The multimedia system further comprises a user interface being configured to request the playback of a given one of the plurality of the multimedia sources or of a given multimedia data based on an input of a user of the multimedia system. A playback unit is configured to perform the requested playback. The multimedia system further comprises a control unit being configured to automatically extract at least portions of the playback as tracks, the tracks being characteristic audio and/or video parts of the playback allowing a unique identification of the playback. The multimedia system further comprises a communication interface being configured to connect to the Internet and to automatically send first data comprising the tracks to a remote server and further being configured to automatically receive second data in response to the sent first data from the remote server. The second data comprises identification information of the playback and the identification information being determined based on the tracks and uniquely identifying the playback.

For example, the first data may further include an identity of the user. In addition, a user identification may be retrieved via the user interface from the user.

For example, the identification information received as part of the second data may be used for operating said user interface. In addition, the identification information may be presented to the user via the user interface.

The multimedia system may be an audio-video-receiver (AVR) or an in-vehicle entertainment system. The multimedia system may also be a portable electronic device. The communication interface may establish a wireless and/or fixed (wired) connection to the Internet. In general, the multimedia sources may be audio and/or video sources. The multimedia sources of the plurality of multimedia sources may allow for individual selection of a given multimedia data or may allow for the playback of a predefined stream of the multimedia data. Examples for the latter case may be FM radio, analog radio, digital radio (e.g., Digital Audio Broadcasting (DAB), Satellite Radio, HD-Radio), television; while examples for the first case may be digital storage units comprising multimedia data such as ".mp3"-files or ".avi"-files or the like, or compact disc (CD) or digital video disc (DVD) players or the like allowing for individual selection of different pieces of music and/or video. It should be understood that in some cases, depending on the point of view, a certain multimedia source may be classified as, both, providing a predefined stream of multimedia data or providing the playback for individually selectable multimedia data. As such an example, one may consider the playback of a movie from a digital video disc (DVD) or BluRay disc: While individual video chapters may be individually selectable, the background audio of each of the video chapters is not individually selectable and can therefore be regarded as a stream of audio multimedia data. In any case, the multimedia sources may be selected from the group consisting of: television, digital radio, analog radio, FM radio, long waveband radio, compact disc, digital video disc, BluRay disc, Internet radio, Internet video platform, Internet audio and video streaming server, analog and digital television, hard disc drive, external portable devices connected via Universal Serial Bus, remote storage connected via a remote storage interface, gaming console, external devices connected via Video connection or other connection types, local area network entertainment server. This list is not to be construed as being limiting; various other multimedia sources employing different connection types and standard may occur to the skilled person.

Depending on the particular type of the multimedia source, the user interface may allow to request the playback of the multimedia source itself or the given multimedia data. For example, the user interface may comprise buttons, a voice input mechanism, a touchscreen, gesture recognition, or a combination thereof. In particular, the user interface may comprise a menu structure displayed on a display, where the menu offers the user the selection of particular multimedia sources or of a particular multimedia data of the multimedia source (i.e., the menu may be interactive).

Playback may relate to outputting of the multimedia data to the user in a human perceivable manner (e.g., the playback of music via loudspeakers, the playback of video via a display, and so forth). The playback unit may comprise one or more amplifiers, and/or loudspeakers, and/or headphones, and/or a display. For example, for the playback of a television multimedia source, the playback unit may employ a display in combination with loudspeakers. However, for the playback of an audio CD or FM radio, the playback unit may employ only loudspeakers.

The tracks are automatically extracted from the playback. In other words, the tracks being portions of the playback may correspond to segments or snapshots or temporal excerpts of the playback (i.e., excerpts of the audio and/or video part of the playback). In particular, the control unit may extract the tracks in a certain multimedia data format independently of the multimedia data format of the given multimedia source. For example, the data format of the tracks may be the same for all of the multimedia sources of the plurality of multimedia sources or it may depend on the type of the multimedia source (e.g., if the playback is audio or video or combined audio/video playback). In one embodiment, the control unit may record the playback (e.g., in real-time). However, if, for example, the playback relies on digital multimedia data of the multimedia source it may also be possible that the control unit creates digital excerpts of the multimedia data by data copying or duplication. In this regard, it may be possible that the multimedia source employs transcription of the data format. Various techniques of transcription are known to the skilled person, therefore there is no need to discuss further details in this context.

For example, unique identification of the playback may be possible if the track is sufficiently long and includes sufficiently characteristic parts of the playback. For example, if the playback at a given period in time contains only silent parts, it may not be possible to uniquely identify the playback using the respective track containing the silent parts. However, if the track corresponds to segments of the playback allowing for a characteristic and unique fingerprint of the playback (i.e., containing time-domain and/or frequency-domain tokens of significance), a unique identification of the track may be possible. For example, there are algorithms known in the state in the art which allow for such an identification. An example is given in the document "An industrial-strength audio search algorithm" by A. L. Wang of Shazam Entertainment, Ltd., ISMIR 2003, 4$^{th}$ Symposium Conference on Music Information Retrieval (Oct. 26, 2003), pp. 7-13.

The term playback must not to be construed as being limiting. For example, playback may relate to the playback of an entire movie of several hours in length. However, the term playback may also relate to the different chapters of the movie, each being, for example, a few to ten minutes in length and individually selectable by the user. Also, the term playback may relate to different background music parts of a chapter of the movie. For example, one background music playback may have a duration of, for example, 2 to 3 minutes and may not be selectable by the user. Therefore, different fractions of an overall playback may also be referred to as the playback. Unique identification may be possible for each of those playbacks, in particular for playbacks having a very different durations on the order of seconds to hours.

By sending the first data comprising the tracks via the Internet to the remote server and performing the identification of the playback at, for example, the same remote server, and receiving the second data comprising the thus obtained identification information of the playback, an efficient and computationally inexpensive technique for identifying the playback may be implemented.

For example, the identification information may comprise such information as artist, track, album, recording date, playback date, genre, cover art, etc. In other words, the identification information may be text and/or visual data. Using such data, it may be possible to uniquely identify a given playback. Unique identifiers for certain databases may also be part of the identification information.

For example, the multimedia system may further comprise a display which may be configured to graphically indicate the identification information received via the second data. In particular, displaying the identification information during the respective playback may have the effect of providing additional background information of the playback to the user. This may have the effect that the user always knows which particular piece of audio and/or video is currently subject to the playback. For example, this may allow to identify a pre-recorded analog video recording (e.g. "Star Wars—Episode 4"). It may also be possible to uniquely identify the background music of a television show (e.g. "Imperial March by John Williams").

In particular, it may be possible to automatically provide identification information of the playback of the entire audio and/or video (multimedia) consumption of the user. The automatic extraction and automatic sending and receiving of the first and second data may allow to perform the identification of the playback in the background. For example, the user may listen to FM radio and the multimedia system may automatically and continuously perform the identification in the background. By, for example, extracting tracks at given time intervals, different and subsequent audio pieces of the radio program may be each uniquely identified. In case of a television program or a movie being watched by the user, it may be possible to provide identification information of each movie or song title appearing, e.g., as background music in the television/movie playback. It may also be possible to identify commercial breaks by commercial break music or the like.

The multimedia system may further comprise a playback archive being configured to locally or remotely store previous identification information. The playback archive may be coupled to the user interface. The user interface may be configured to allow the user to view a timeline of previous playbacks based on the stored previous identification information to allow requesting the playback based on the timeline.

In other words, the timeline may be a historical overview or catalogue of previous playbacks of the user. The timeline may enable the user to view the entire music and/or video life in a time-lined library. A digital footprint of the multimedia consumption of the user may be created with the playback archive and the timeline. By remotely storing previous identification information, the user may be able to save the entire audio and/or video playback history without having to use local storage space. In particular, the remote storage of the identification information handled via the playback archive of the multimedia system may be referred to as a cloud application. The cloud application may correspond to a provisioning of the identification information independently of the particular multimedia system the user employs at a given moment in time. For example, the user may use different multimedia systems, as an AVR at home and an in-vehicle entertainment system when in the car to access one and the same playback archive.

This all may have the effect of systematic organization of the multimedia consumption of the user. The user may have the possibility to keep track of his multimedia consumption. Moreover, this may allow the determination of preferences, of so far unknown multimedia pieces, and so forth.

In general, the user interface may be configured to request the playback further based on previously received second data relating to identification information of a previously requested playback.

For example, by comparing the identification information of previous playbacks with a local or remote database, it may be possible to identify those playbacks out of a series of playbacks (e.g. those episodes of a television series) which have not been subject to playback yet. This may allow providing the user interface in an interactive and adaptive manner which is dependent on the previous playbacks of a user. The user may be able to request those playbacks which the user has not consumed before. Similar effects may be obtained with respect to the playback archive.

In particular, the user interface may comprise an identification and/or authentication unit being configured to receive user identity and/or authentication information of the user. The first data may further comprise at least parts of the user identity information and/or of the user authentication information. The user authentication information may include a user identity to avoid misuse of the user identity. Security measures may be taken such that only the authenticated user may use the user identity. For example, the authentication unit may comprise a menu where the user enters a user name and a password for the authentication. Also, the user interface may comprise a fingerprint sensor or may comprise a previously stored user authentication code. The user authentication data may be subsequently stored locally or remotely. In particular, in connection with the embodiment relating to the cloud application as set forth above, remote storage of the user authentication information may be desired, for example, in order to facilitate the provisioning of the playback archive.

If the first data further comprises at least parts of the user authentication information, it may be possible to individually link the identification information being determined based on those tracks included in the first data to a given user. This may have the effect of easily storing identification information in connection with the user authentication. For example, the playback archive may comprise the particular user authentication information. Thus, it may be possible to obtain a personalized and user-specific playback archive.

The second data may further comprise playback control information including operational settings of the playback. The playback unit may be configured to perform the playback based on the playback control information. For example, the playback control information may comprise the operational settings relating to a language setting of the playback (e.g., audio track "German" or "English"), an audio channel setting (such as "Dolby Digital", "Dolby 5.1" or "Dolby 7.1"), a color/contrast/brightness/saturation setting of the display of the playback device, etc. Such operational settings may relate to predefined or otherwise favored settings of the user. For example, if, based on the user authentication information, it is known that a given user prefers the playback in the English language rather than in the German language, the second data may comprise the playback control information being indicative of just this setting. Respective data may be stored at the remote server or locally (i.e., within the multimedia system). The respective information may be obtained from previously received data of the multimedia system.

Also the playback control information may comprise authorization and/or validity information. For example, if the playback relates to a proprietary content which needs to be rented or bought by the user, the playback control information may comprise respective indicators indicating that the user is authorized for the playback. For example, the authorization and/or validity information may be included in response to a prior billing of the playback. The playback device may be configured to selectively enable the playback based on the respective authorization and/or validity information.

The multimedia sources may comprise a local storage unit and a remote storage interface. The local storage unit may be configured to locally store the multimedia data while the remote storage unit may be configured to receive the multimedia data through the Internet from a remote storage. Based on the received playback information, the playback unit may be configured to selectively perform the playback based on the multimedia data of the local storage unit or of the remote storage interface. For example, different multimedia data may be stored at a centralized server providing the remote storage (e.g., in the cloud application embodiment). The remote storage interface may be configured to automatically connect to the remote storage in order to allow the downloading and the playback of the multimedia data. However, it may also be possible that multimedia data is locally stored in the multimedia system. For example, the local storage unit may be a hard disk drive, flash memory, USB memory, an interface to a portable electronic device being connected to the multimedia system (e.g., via Bluetooth, etc). Different techniques are known in the art such that there is no need to explain further details in this context.

If the playback unit selectively performs the playback based on the multimedia data of the remote storage interface, the unique communication interface may be further configured to send third data comprising at least parts of the identification information and at least parts of the user authentication information to a further server in order to enable billing of the playback (e.g., to perform the billing). For example, the playback of the multimedia data downloaded from the remote storage may be a service liable to pay costs. In such a case, in order to perform the playback, the user may be required to pay a certain amount of money. By providing the identification information and the authentication information, it may be possible to automatically enable the billing in order to perform the playback. For this purpose, for example, a connection to a dedicated third-party server providing the pay services may be established through the Internet. The billing may be referred to as wireless billing, as it may be expedient for the user to physically perform the money transaction.

The control unit may further be configured to automatically extract the tracks based on an algorithm. The algorithm takes into account a time interval between subsequently extracted tracks and a previously received second data and a type of the multimedia source.

For example, the algorithm may be configured to extract the tracks having a given duration and with a fixed time interval if there is no identification information already available or no second data has been received for a predefined time interval. At the same time, for example, the time interval between and the length of the extracted tracks may be dependent on the multimedia source. For example, if the multimedia source is a FM radio, the time interval between different extracted tracks, each, for example, being 20 seconds in length, may be 2-5 minutes. Differently, if the multimedia source is a Bluray player, the time interval between different extracted tracks may be set to a longer value, such as for example, 10 minutes. Also, if the multimedia source is for example a local storage unit and the locally stored multimedia data are ".mp3"-files, identification information may be readily available in the form of "ID3"-tags. In such a case, it may not be necessary to extract tracks, as the identification information in the form of ID3-tags is already available. Or, it may be desired to verify the ID3-tag information. If the ID3-tag information is incomplete, it may be desired to add the received identification information.

Such examples are merely illustrative and are not to be construed as being limited. Different algorithms allowing for optimized identification of the playback may be employed and may be subject to system design. In particular, different playback types and different multimedia sources may require different strategies for adapting the algorithm.

In one embodiment, if the playback is a combined audio and video playback, the track may comprise at least portions of an audio part of the audio and video playback. For example, the playback may be a television channel. Then, for example, the track may comprise segments of the audio part of the playback only. This may, for example, allow to automatically identify background music of the television channel.

The control unit may further be configured to establish playback properties information being indicative of characteristic operational properties of the multimedia system. The communication interface may be further configured to send during the playback fourth data to the server, the fourth data comprising the playback properties information. The communication interface may be further configured to receive fifth data from the server, the fifth data comprising historical playback statistics corresponding to a plurality of previously established playback properties information.

For example, the playback properties information may be indicative of such characteristic operational properties of the multimedia system as playback volume, playback decibel, power consumption, enabled loudspeakers, enabled display, equalizer settings, etc. Fifth data corresponding to a plurality of previously established playback properties information may relate to summed or otherwise processed historical playback properties information (i.e., statistics thereof). The fifth data may enable the user to obtain an overview of his multimedia consumption habits. For example, the fifth data may be indicative of the total time of music that the user listened to. It may also be indicative of the total number of tracks and albums that the user has been listening to. The fifth data may further be indicative of a value of decibel having been generated by the user in total and/or during a specific time interval. The fifth data may further be indicative of a sum of energy having been consumed by listening to music.

According to a further aspect, a method of performing a playback by a multimedia system is provided. The method comprises requesting the playback of a multimedia source or of a multimedia data provided by the multimedia source by a user interface. The method further comprises receiving the multimedia data from the multimedia source in response to the requesting and performing the playback using a playback unit by the received multimedia data. The method further comprises automatically extracting at least portions of the playback as tracks, the tracks being characteristic audio and/or video parts of the playback allowing for a unique identification of the playback. The method further comprises sending first data via the Internet from the multimedia system to a remote server, the first data comprising the tracks and identifying, at the remote server, the playback based on the first data to determine identification information, the identification information being determined based on the tracks, and uniquely identify the playback. The method further comprises receiving, in response to the sending, second data at the multimedia system, the second data comprising the identification information of the playback.

For such a method, effects may be obtained which are comparable to the effects as obtained from the multimedia system according to a further aspect of the present invention as previously discussed.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

In the following, the invention will be explained in further detail with respect embodiments illustrated in the accompanying drawing.

DETAILED DESCRIPTION

Figure 1:
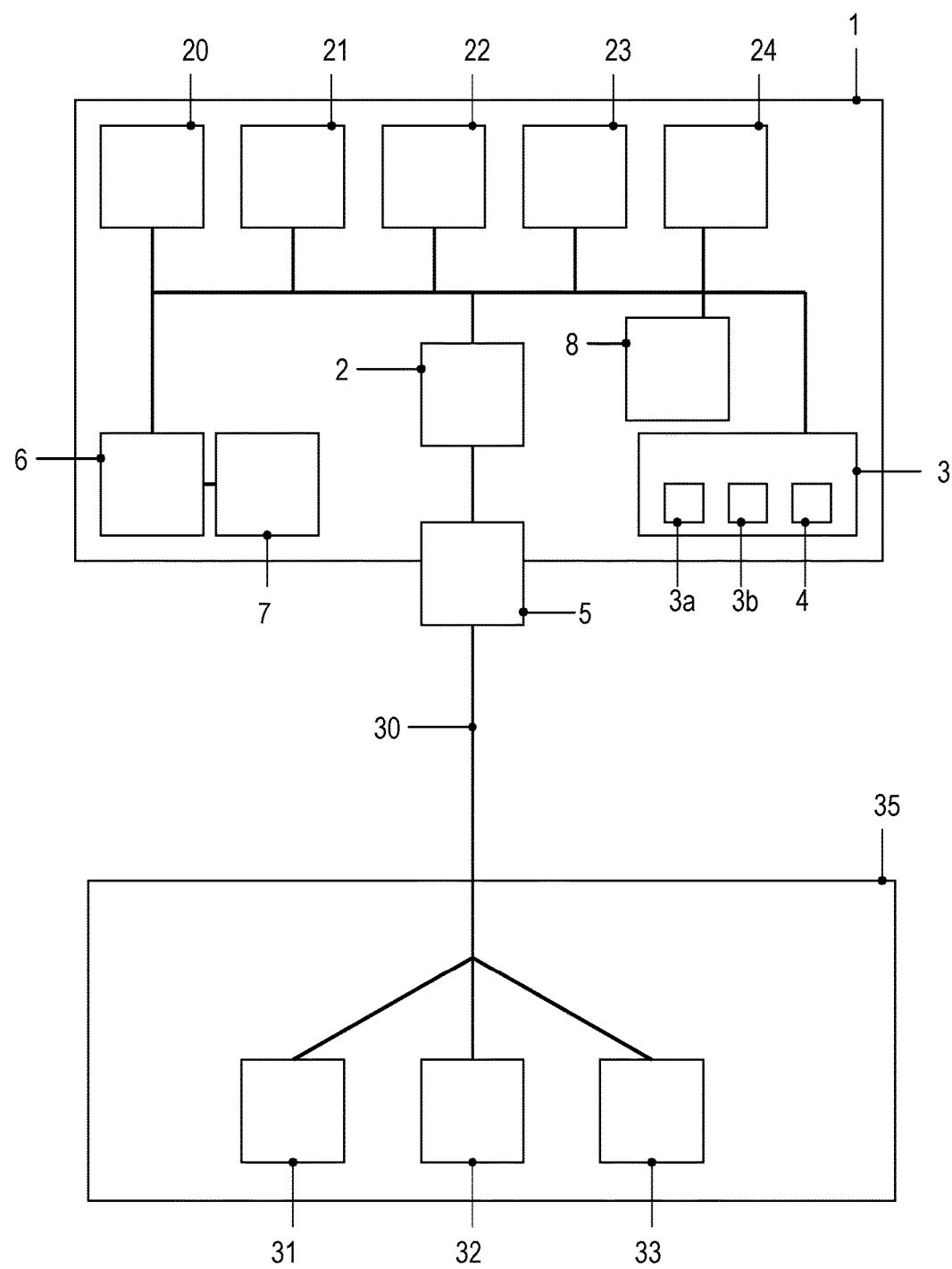
FIG. 1 is a schematic illustration of a multimedia system according to various embodiments of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the following, the invention will be explained in more detail by referring to exemplary embodiments and to the accompanying drawings. The illustrated embodiments relate to techniques for uniquely identifying a playback of various multimedia sources in a multimedia system. Any connection or coupling between functional blocks, devices, components or other physical or functional units shown in the drawings or described herein may also be implemented by an indirect connection or coupling. A coupling between components may also be established over a wireless connection. Functional blocks may be implemented in hardware, firmware, software or a combination thereof. E.g. different multimedia sources may share certain hardware components, e.g., digital signal processors and/or interfaces.

FIG. 1 is a schematic illustration of a multimedia system 1 according to various embodiments of the present invention. The multimedia system 1 comprises a plurality of multimedia sources 21-24, each being configured to provide multimedia data for a respective playback. The multimedia system 1 enables the detection and keeps track of all the multimedia (i.e., audio and video) consumption of a user. A personal fingerprint of the user's multimedia consumption is created in a cloud 35. The cloud 35 includes of a number of servers 31-33 and is connected via Internet 30 to a communication interface 5 of the multimedia system 1. The personal fingerprint is a music catalogue comprising the digital footprints of the playbacks on the multimedia system 1. For example, one digital footprint may comprise such information as artist, track, album, date, genre, and cover art of the playback and time and date of the playback(s). The digital footprint may be in the form of a timeline and correspond to a playback archive. This personal footprint of the playback is generated automatically by the multimedia system 1 independently of the type of the employed multimedia source 20-24 by techniques as will be explained hereinafter. In particular, also such playbacks can be catalogued and added to the digital footprint in the cloud 35 which do not inherently provide identification information uniquely identifying the playback (e.g., playbacks of analog multimedia data).

The multimedia sources 20-24 of the multimedia system 1 comprise a radio 20 (e.g., an FM or digital radio), a compact disk player 21, a hard drive 22 (e.g., for storing MP3s or video data), a USB connection 23 (e.g., for connecting to a remote portable device), and a remote storage interface 24 for connecting to remote storage. For example, the remote storage connected via the interface 24 may comprise MP3 or video data. Different numbers and types of the multimedia sources 20-24 may be employed.

Furthermore, the multimedia system 1 comprises a playback unit comprising of at least one loudspeaker 6 and possibly a display 7. The playback unit may further comprise an amplifier (not shown in FIG. 1). Different embodiments of the playback unit, for example, without the display 7 or the loudspeakers 6 are possible. Furthermore, the multimedia system 1 comprises a user interface 3 which includes a touch panel 3a, buttons 3b, and an authentication unit 4. The user interface 3 is configured to allow input for control of the multimedia system 1 from a user. Furthermore, it is configured to output certain information to the user. For example, the touchscreen 3a may be configured to display a menu structure which allows the user to request the playback of a given one of the plurality of the multimedia sources 21-24 or of a given multimedia data. In general, the user interface 3 allows for interactive user control.

For example, the hard drive 22 may comprise a plurality of audio files and/or video files which can be each individually requested for playback through the playback unit 6, 7 as multimedia data. For example, audio file formats may be ".mp3", ".wmv" or the like. For example, video file formats may be ".avi", ".mpeg", ".flv", "video_TS" folders, MPEG encoded, H.261-, H.263-, H.264-encoded, and the like. This list is not to be construed as being limiting. It is used in particular to illustrate the wide variety of multimedia data that may be handled by the multimedia system 1.

Differently, the radio 20 may not allow individual playback of multimedia data. The radio 20 may instead provide a stream of multimedia data of analog or digital type which is predefined or pre-recorded at a remote site. The user may select the playback of the radio 20. Respectively, the degree of selection possibly by the user through the user interface 3 may be different in the cases of the units 20, 22.

The authentication unit 4 is configured to receive or determine user authentication information. For example, the authentication unit 4 may be a fingerprint sensor. It is also possible that the authentication unit 4 comprises a menu structure displayed on a display allowing a user to enter a serial number and/or the personal details of the user and/or a password. Such user authentication information may be used to individually link data stored in the cloud 35 with a given user of the multimedia system 1. It may also be used in order to perform billing of proprietary playbacks. For example, in the cloud 35, there is the second server 32 which is configured to perform the billing based on the identification information of the given playback and on the authentication information. This can in particular be the case if the playback is requested from the remote storage interface 24 accessing remotely stored multimedia data. For example, the multimedia data accessed via the remote storage interface 24 may be stored on the server 33 (e.g., third server) being a remote storage in the cloud 35.

Depending on the particular type of the playbacks, the particular type of the multimedia data used for the playback, and the particular type of the used multimedia source 20-24, the playback may inherently provide some sort of identification information. Such identification information may comprise elements from the group consisting of: artist, track, album, data of recording, genre, cover art. In other words, the identification information may be a combination of text and images. However, such information is typically not or only to a smaller degree available for multimedia sources such as the radio 20 or the CD player 21. Also, the amount and the integrity of identification information available for the various multimedia sources 20-24 may vary considerably. For example, the multimedia data in the form of MP3 data may be associated with identification information in the form of a ID3-tag. However, the ID3-tag may be incomplete or even wrong.

Therefore, the multimedia system 1 implements techniques which automatically provide identification information for each playback. For this reason, a control unit 2 is provided. The control unit 2 is configured to automatically extract at least portions of the playback as tracks. The tracks are characteristic audio and/or video parts of the playback which allow for a unique identification of the playback. For example, the tracks can be automatically extracted in predefined time intervals, e.g., on the order of a couple of ten seconds, and can have a predefined length, e.g. on the order of 10 to 20 seconds. Then, via analysis of the time-domain and frequency-domain properties of the track, it is possible to create identification information which uniquely identifies the playback. In this regard, the communication interface 5 is configured to connect to the Internet 30 and to automatically send first data comprising the tracks to a remote server 31 located in the cloud 35. The remote server 31 is configured to identify, based on the received tracks, the playback and to create the identification information which uniquely identifies the playback by parameters such as artist, title etc. as set forth above. The identification information may furthermore comprise a timestamp of the playback. In response to the sent first data, the communication interface 5 is configured to receive second data from the server 31 which comprises the obtained identification information of the playback.

Figure 2:
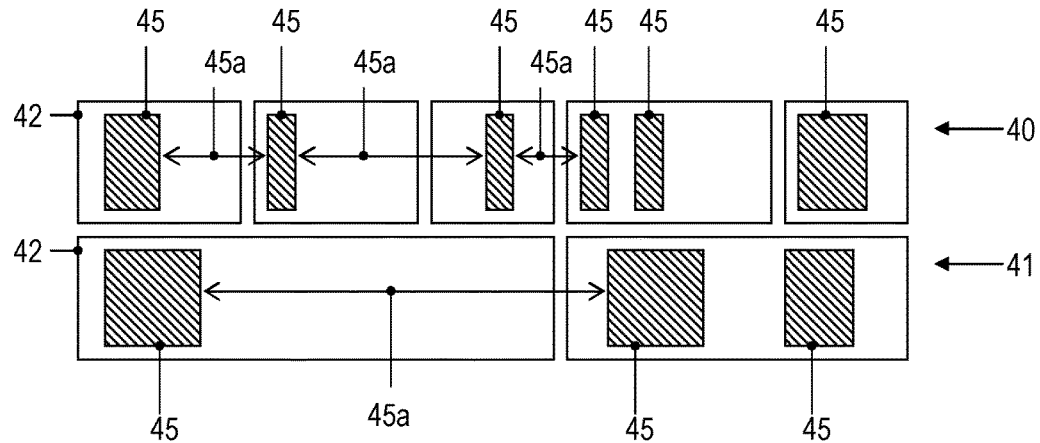
FIG. 2 illustrates the extraction of tracks from a combined audio and video playback.

In FIG. 2, the extracting of the tracks 45 is schematically illustrated. As shown in FIG. 2, multimedia data 42 relating to an audio playback 40 and a video playback 41 is provided. For example, the combined playback 40, 41 can be part of a television channel provided by a respective one of the multimedia sources 20-24. FIG. 2 illustrates the playback 40, 41 over time.

As can be seen from FIG. 2, the tracks 45 are extracted for various time periods for the different segments of the playback 40, 41. An algorithm is used to determine the time position and the duration of the extracted tracks 45. For example, the algorithm may take into account the multimedia source 20-24 providing the playback 40, 41 and previously received second data (i.e., previously received identification information), and a time interval 45a between subsequently extracted tracks 45. For example, in order to uniquely identify a certain segment of the audio playback 40, it may be sufficient to extract a track 45 of comparably short duration if compared to the video playback 41.

The audio playback 40 includes five segments as graphically indicated in FIG. 2. For example, those segments may correspond to different background music parts of the video playback 41. For the first three segments, respectively one track 45 is extracted. For the fourth segment two tracks 45 are extracted. This can be the case if, for example, unique identification of this respective segment of the audio playback 40 fails using a single track 45. It should be understood that each of the five segments of the audio playback 40 can be considered as an individual playback. Respectively, the multimedia system 1 uniquely identifies each of those individual playbacks/segments. Similarly, these aspects apply to the video playback 41.

It should be understood that the file format used by the multimedia system 1 for the tracks 45 does not necessarily need to be the same file format as that used for the multimedia data 42. In particular, for example, it is possible that the tracks 45 are extracted via real-time recording of the playback itself. It is also possible that the tracks 45 are extracted by real-time transcoding of the multimedia data 42. It is also possible, that parts of the multimedia data 42 is duplicated to obtain the tracks 45. In such a case, the tracks 45 and the multimedia data 42 may have the same file format. The copying of the tracks may occur faster than real-time. In particular, it may be desired to provide the tracks 45 with a smaller file size per playback duration (i.e., at a higher compression factor and/or lower quality), than the multimedia data 42. This may be the case as the tracks 45 are used for uniquely identifying the playback 40, 41, but are not presented to the user of the multimedia system 1. Depending on the particular type of the playback 40, 41 and depending on the particular type of the multimedia source 20-24, either one or a combination of those options may be chosen.

Figure 3:
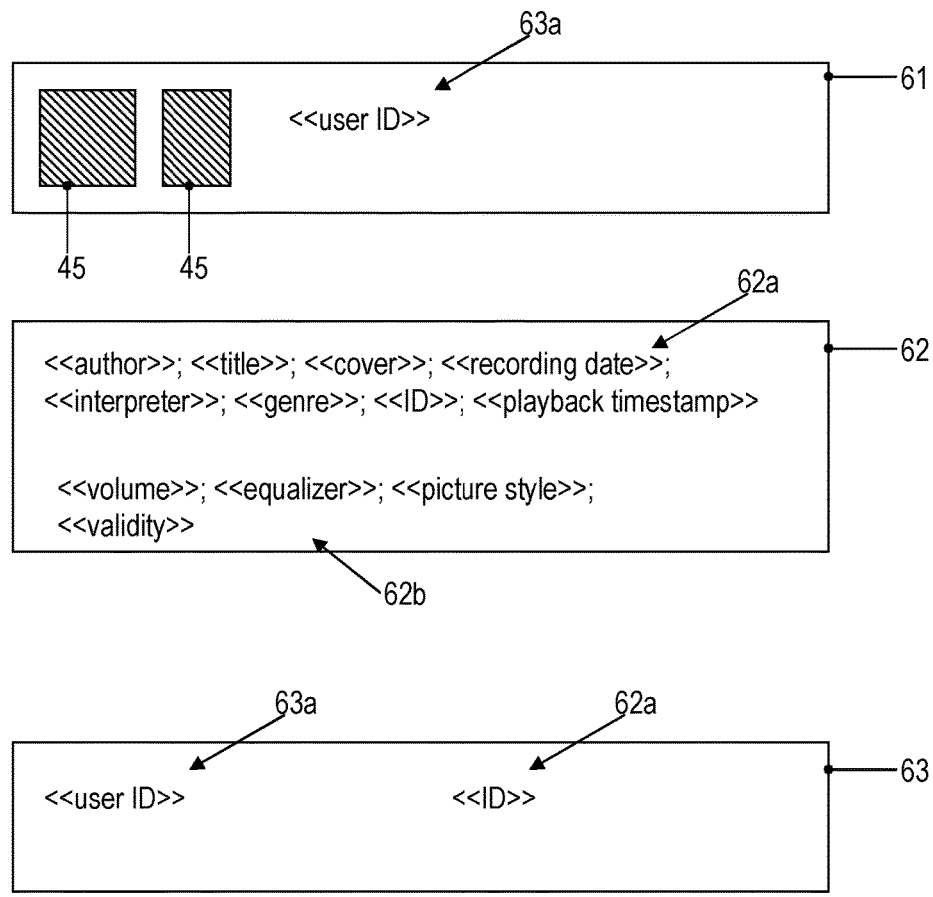
FIG. 3 illustrates first, second and third data employed for identifying a playback, setting properties of the playback, and for payment of the playback.

FIG. 3 includes an uppermost part that depicts the first data 61 as sent by the communication interface 5 to the remote server 31. The first data 61 comprises two tracks 45 in the case of the example illustrated in FIG. 3. Furthermore, the first data 61 comprises the authentication information 63a as obtained via the authentication unit 4 as set forth above. In this case, the playback 40, 41 may be uniquely matched to a given user of the multimedia system 1.

In FIG. 3, as also shown is the second data 62 as sent from the remote server 31 in response to the received first data 61 to the communication interface 5 upon identification of the playback 40, 41. The second data 62 comprises the identification information 62a which, in the case of FIG. 3, includes information on the author or artist of the playback, the title of the playback, cover art of the playback, for example a bitmap file, a recording date of the playback, an interpreter, a genre, and a unique ID. Such information is typically available from proprietary databases as known to the skilled person. Various techniques allow the identification of the playback to yield the identification information 62a based on the tracks 45. Accordingly, there is no need to discuss further details of the identification of the playback in this context. The identification information 62a includes a playback timestamp (i.e., time and date of the playback).

Furthermore, the second data 62 includes playback control information 62b. The playback control information 62b comprises operational settings used for the playback by the playback unit 6, 7. Such information in the case as illustrated in FIG. 3 relates to a volume setting, an equalizer setting, and a picture style setting. For example, the volume setting and the equalizer setting can be used in order to configure the amplification before outputting via the loudspeaker 6. The picture style setting may comprise color settings and contrast settings as used for the display 7. Such information 62b may be added to the second data 62 by the server 31 based on predefined preferences of the user as identified by the user authentication information 63a in the first data 61. It is also possible that the particular settings indicated by the playback properties information 64a relate to those settings previously chosen by the user for the given playback.

Figure 4:
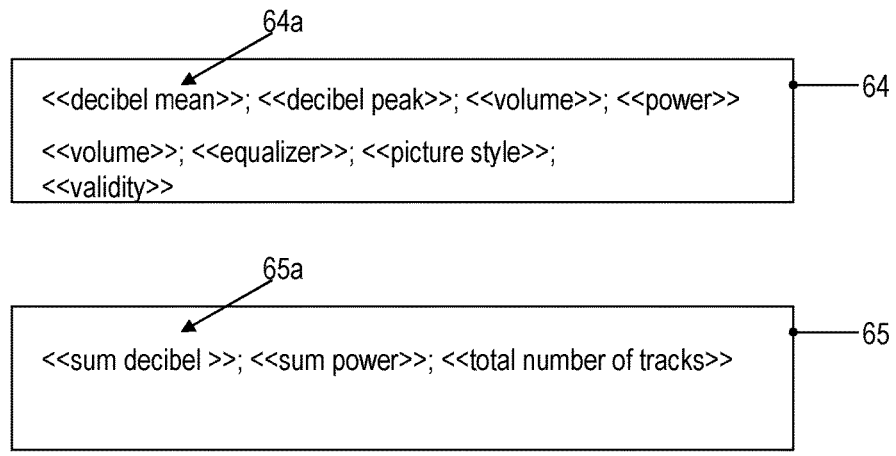
FIG. 4 illustrates fourth and fifth data employed for determining properties of the playback and historical playback statistics.

In this regard and referring to an upper part of FIG. 4, the control unit 2 is configured to establish playback properties information 64a including various parameters. The communication interface 5 is configured to provide, during the playback, such information to the remote server 31. The remote server 31 (or a local storage) can store this playback properties information 64a in connection with the identification information 62a of the given playback and the user authentication information 63a and, based on this, provide the playback control information 62b, for example, if the same playback is requested at a later point in time by the same user.

The playback properties information 64a as depicted in FIG. 4, upper part, can include additional information of characteristic operational properties of the multimedia system 1, such as generated decibel, number of loudspeakers used, power consumption, etc. Such data can be stored and processed by the remote server 31 and used in order to provide fifth data 65 (as shown in FIG. 4, lower part). The fifth data 65 comprises historical playback statistics 65a which correspond to a plurality of the previously established playback properties information 64a (e.g. in a processed manner relating to sums and statistics). For example, the historical playback statistics 65a can comprise such information as the total number of hours of music that the user of the multimedia system 1 has listened to, the total number of tracks in an album that the user of the multimedia system 1 has listened to, the accumulated decibel value that the user of the multimedia system 1 has generated and an accumulated energy consumption of the multimedia system 1. Such information can be provided to the user of the multimedia system 1 as related background information or fun trivia, for example, via the display 7. It can be used to provide statistics and classification of the audio and video consumption of the user during an extended time period.

In general, it can be desired to automatically determine and store such playback properties information 64a and the identification information 62a for each playback 40, 41 of the multimedia system 1 as a playback archive. For example, this information 62a, 64a can be stored on one of the servers 31-33 or also using a local storage 8 of the multimedia system 1 of FIG. 1. The local storage 8 is an optional unit. This allows to store and provision a complete digital footprint of the users' multimedia consumption (e.g., in a catalogue form provided at the cloud 35). In the following, with respect to a lower part of FIG. 3 and FIG. 5, two further applications will be discussed.

In the lower part of FIG. 3, third data 63 is shown including parts of the user authentication information 63a and parts of the identification information 62a. In particular, unique identifiers of the user and the playback 40, 41 are provided. The third data 63 is sent from the communication interface 5 to the server 32 in order to enable billing of the playback 40, 41 as identified via the identification information 62a. For example, the user of the multimedia system 1 may request the playback of multimedia data 42 via the remote storage interface 24. The remote storage interface 24 in such a scenario may connect to an Internet service subject to charge, for example, in response to received playback control information 62b comprising respective instructions (not shown in FIG. 3) or without such instructions. In any case, such multimedia data 42 can be proprietary and may be subject to a charge. In this regard, in order to provide the pay service, the third data 63 may be sent to the server 32 which in turn provides the billing. Then, in the second data 62 the playback control information 62b may include a validity or authorization identifier (not shown in FIG. 3) which indicates to the playback unit 6, 7 that the playback 40, 41 of the proprietary multimedia data 42 is authorized by a successful billing process. Then, the playback unit 6, 7 may enable the playback 40, 41.

Figure 5:
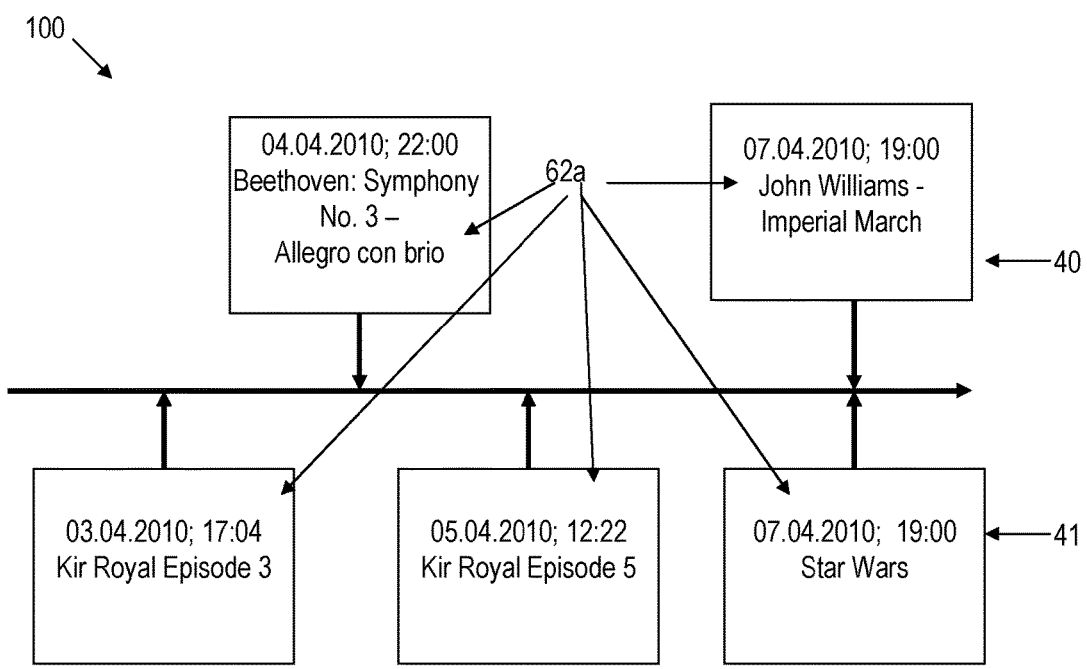
FIG. 5 schematically illustrates a timeline being indicative of pervious playbacks stored in a playback archive.

Turning to FIG. 5, a further application of the playback archive or digital footprint (e.g., in the cloud 35 or on the local storage 8) of the multimedia consumption of the user of the multimedia system 1 is illustrated. This application relates to a timeline 100. The timeline 100 enables the user of the multimedia system 1 to view his whole music and video life in a time-lined library. As can be seen from the schematic illustration of FIG. 5, the timeline 100 includes entries relating to the identification information 62a in connection with time stamps identifying the particular time of the respective playback 40, 41. As shown in the upper part of FIG. 5, chronologically sorted audio playbacks 40 are provided. In the lower part of FIG. 5, the respective video playbacks 41 are depicted. Based on the timeline 100, for example, the user interface 3 of FIG. 1 can generate a recommendation to the user of the multimedia system 1 to request the playback 40, 41 of certain multimedia data 42 which the user has not consumed before, but which is related to other consumed multimedia data 42. In the case of the example as illustrated in FIG. 5, this could be Episode 4 of the Kir Royal series. Also, as can be seen from FIG. 5, the timeline 100 can be used in order to identify background music of a combined audio and video playback 40, 41. When the user requests the playback 40, 41 of, for example, a movie, the multimedia system 1 can be configured to automatically extract tracks relating to the audio portions of the playback. Through this condition, the background music of the combined audio and video playback 40, 41 can be automatically identified.

In general, the timeline 100 can be generated based on locally or remotely stored previous and/or current identification information 62a as set forth above. This storage of the identification information 62a is associated with the playback archive. In particular, the playback archive may be in the form of the local storage 8 or in the form of remote storage (e.g., on the servers 31, 33). Then the user interface 3 is configured to request the playback 40, 41 based on the timeline 100.

Figure 6:
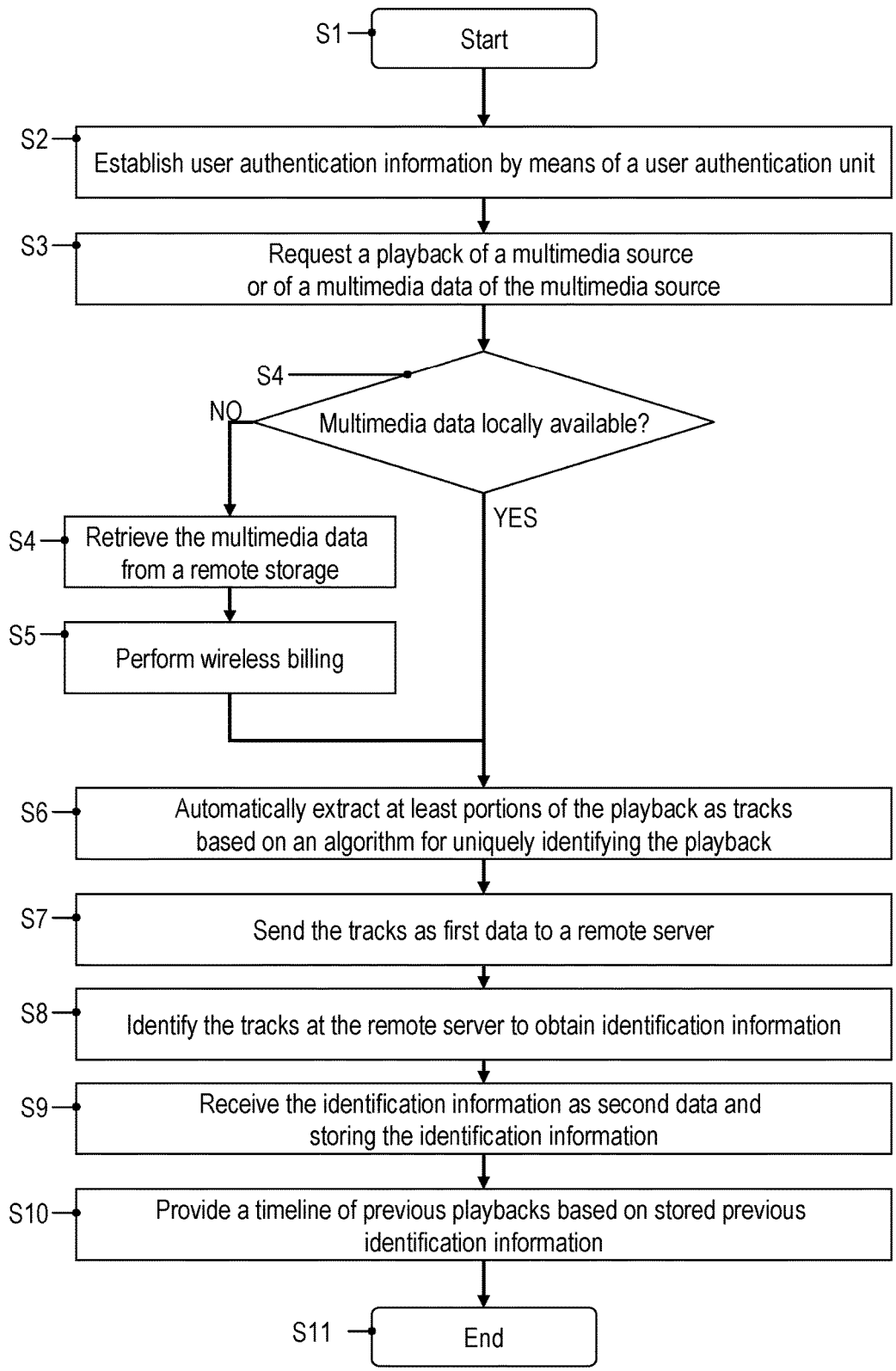
FIG. 6 is a flowchart of a method of performing a playback according to various embodiments of the invention.

FIG. 6 is a flowchart illustrating a method of performing a playback by the multimedia system 1. The method starts with step S1. In step S2, the user authentication information 63a is established by means of the authentication unit 4. For example, in step S2 the user of the multimedia system 1 needs to enter a password. Step S3 is an optional step. Also, other forms of authentication are conceivable such as pre-stored or automated authentication.

In step S3, the user of the multimedia system 1 requests the playback 40, 41 of a given one of the plurality of the multimedia sources 20-24 or of a particular one of the multimedia data 42 of the respective one of the multimedia sources 20-24. For example, in step S3, the user may either chose the playback of a given multimedia data or may request the playback of a streaming of such multimedia data 42 by choosing the given one of the multimedia sources 20-24.

In step S4, it is subsequently checked whether the multimedia data 42 that the user either explicitly or implicitly requested in S3 is locally available (i.e., available within the multimedia system 1). In this case, for example if the user requests the playback of the radio 20, receiving of the possible analog multimedia data 42 via a tuner of the radio 20 makes the respective multimedia data 42 locally available. However, if the user chooses a certain audio file which is not locally available but, for example, available on a remote storage and needs to be actively downloaded, he may do so by the remote storage interface 24.

In such a case, if the multimedia data is not available locally, in step S4 the multimedia data 42 may be retrieved or downloaded from the remote storage 33 via the remote storage interface 24. If necessary, in step S5, billing can be performed by the third data 63 comprising user authentication information 63a and identification information 62a of the requested playback 40, 41.

However, if it is determined in step S4 that the multimedia data 42 requested by the user is locally available, the method continues with step S6. In step S6, the control unit 2 automatically extracts at least portions of the playback 40, 41 as the tracks 45 based on an algorithm. The algorithm may take into account the time interval 45a between subsequently extracted tracks 45 and on the previously received second data 62 and the type of the multimedia source requested for playback in step S3. For example, if unique identification of the playback 40, 41 is already available, the algorithm may adapt the time intervals 45a to a comparably longer value. In such a case, it may not be necessary to frequently extract tracks for continued identification at a high repetition rate.

In step S7, the tracks 45 extracted in step S6 are sent via the communication interface 5 to the remote server 31 as first data 61 via the Internet 30. The first data 61 can further comprise the user authentication information 63a as established in step S2. In step S8, the remote server 31 identifies the tracks 45 received in step S7 to obtain the identification information 62a. There are techniques known which allow to successfully perform the step S8.

The server 31 may in turn send the identification information 62a of step S8 to the multimedia system 1 as second data 62. The multimedia system 1 receives the second data 62 via the communication interface 5 in step S9. Additionally, the identification information 62a is stored, for example, together with a playback time stamp, in step S9. It should be understood that the storing of the identification information 62a in step S9 can occur either locally within the multimedia system 1, (e.g., on the local storage 8), or externally, (e.g., on a dedicated server 31, 33).

In step S10, the timeline 100 is provided as for example using the user interface 3. The timeline 100 provides a chronological overview of the identification information 62a of all previous playbacks 40, 41. The method ends in step S11.

It should be understood that the particular sequence of carrying out the different steps S2-S10 can vary. For example, it is possible to perform the billing S5 only after receiving the identification information 62a in step S9. However, typically the multimedia data 42 is retrieved from the remote storage 33 in step S4, this can occur along with sufficient identification information 62a such that the billing can already be performed in step S5. It may also be possible to request the playback 40, 41 in step S3 based on the timeline 100 as discussed in connection with step S10. For example, it may be possible to provide the timeline 100 before carrying out step S3 based on the previously established identification information 62a.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

What is claimed is:

1. A multimedia system comprising:
   a plurality of multimedia sources each being configured to provide multimedia data for a playback,
   a user interface being configured to request the playback of a given one of the plurality of the multimedia sources or of a given multimedia data based on an input of a user of the multimedia system,
   a playback unit being configured to perform the requested playback,
   a control unit being configured to automatically extract at least portions of the playback as tracks, the tracks include characteristic audio parts and video parts of the playback allowing a unique identification of the playback, and
   a communication interface being configured to connect to an Internet and to automatically send first data comprising the tracks to a remote server and further being configured to automatically receive second data in response to the first data from the remote server, the second data comprising identification information of the playback, the identification information being determined based on the tracks and uniquely identifying the playback,
   wherein the second data further comprises playback control information including operational settings of the playback,
   wherein the playback unit is configured to perform the playback further based on the playback control information,
   wherein the user interface comprises at least one of an identification unit and an authentication unit being configured to receive user identity and/or authentication information of the user,
   wherein the first data further comprises at least parts of the user identity and/or authentication information,
   wherein the multimedia sources comprise:
      a local storage unit being configured to locally store the multimedia data, and
      a remote storage interface being configured to receive the multimedia data through the Internet from a remote storage,
   wherein based on the playback control information, the playback unit is configured to selectively perform the playback based on the multimedia data of the local storage unit or of the remote storage interface, and
   wherein, if the playback unit selectively performs the playback based on the multimedia data of the remote storage interface, the communication interface is further configured to send third data comprising at least parts of the identification information and at least parts of a user authentication information to a further server in order to enable billing of the playback.

2. The multimedia system of claim 1, further comprising a playback archive being configured to locally or remotely store previous identification information, wherein the playback archive is coupled to the user interface and wherein the user interface is configured to allow the user to view a timeline of previous playbacks based on the previous identification information and to allow requesting the playback based on the timeline.

3. The multimedia system of claim 1, wherein the user interface is configured to request the playback further based on previously received second data relating to identification information of a previously requested playback.

4. The multimedia system of claim 1, wherein the playback is a combined audio and video playback and wherein the tracks comprise at least portions of an audio part of the audio and video playback.

5. A method for performing a playback with a multimedia system, the method comprising:
   requesting the playback of a multimedia source providing multimedia data or of the multimedia data provided by the multimedia source by a user interface,
   receiving the multimedia data from the multimedia source in response to the requesting,
   performing the playback using a playback unit by the received multimedia data,
   automatically extracting at least portions of the playback as tracks, the tracks being characteristic audio parts and video parts of the playback allowing for a unique identification of the playback,
   sending first data via an Internet from the multimedia system to a remote server, the first data comprising the tracks,
   identifying, at the remote server, the playback based on the first data to determine identification information, the identification information uniquely identifying the playback, and being determined based on the tracks, and receiving at the multimedia system, in response to the sending, second data comprising the identification information of the playback, wherein the second data further comprises playback control information including operational settings of the playback, and, performing the playback based on the playback control information, storing previous identification information relating to a previous playback at a local or remote storage of a playback archive, providing a timeline to a user based on the previous identification information, the timeline being indicative of previous playbacks, requesting the playback based on the timeline, determining whether the multimedia data of the requested playback is available on a local storage, and, if the multimedia data is not available on the local storage:

retrieving the multimedia data from a remote storage, establishing user authentication information of a user by an authentication unit, and sending third data comprising at least parts of the user authentication information and at least parts of the identification information to a further server in order to enable billing of the playback.

6. The method of claim 5, further comprising:

establishing playback properties information indicative of characteristic operational properties of the multimedia system, sending, during the playback, fourth data to the remote server, the fourth data including the playback properties information, and receiving fifth data comprising historical playback statistics corresponding to a plurality of previously established playback properties information.

7. A multimedia system comprising:

a plurality of multimedia sources, each being configured to provide multimedia data for a playback;

a user interface being configured to request the playback of one of a first multimedia source of the plurality of the multimedia sources or of a given multimedia data based on an input of a user;

a playback unit being configured to perform the requested playback;

a control unit being configured to automatically extract at least portions of the playback as tracks, the tracks include characteristic audio parts and video parts of the playback thereby allowing a unique identification of the playback; and a communication interface being configured to:
  automatically send first data comprising the tracks to a remote server; and
  automatically receive second data in response to the first data from the remote server, the second data comprising identification information of the playback and the identification information being determined based on the tracks and uniquely identifying the playback, wherein the second data further comprises playback control information including operational settings of the playback, and wherein the playback unit is further configured to perform the playback further based on the playback control information, wherein the user interface comprises at least one of an identification unit and an authentication unit being configured to receive user identity and/or authentication information of the user, and wherein the first data further comprises at least parts of the user identity and/or authentication information, wherein the multimedia sources comprise:
  a local storage unit being configured to locally store the multimedia data, and
  a remote storage interface being configured to receive the multimedia data through an Internet from a remote storage, and wherein based on the playback control information, the playback unit is configured to selectively perform the playback based on the multimedia data of the local storage unit or of the remote storage interface and wherein, if the playback unit selectively performs the playback based on the multimedia data of the remote storage interface, the communication interface is further configured to send third data comprising at least parts of the identification information and at least parts of a user authentication information to a further server in order to enable billing of the playback.

8. The multimedia system of claim 7, further comprising a playback archive being configured to one of locally or remotely storing previous identification information, wherein the playback archive is coupled to the user interface and wherein the user interface is configured to allow the user to view a timeline of previous playbacks based on the previous identification information and to allow requesting the playback based on the timeline.

9. The multimedia system of claim 7, wherein the user interface is configured to request the playback further based on previously received second data relating to identification information of a previously requested playback.

10. A method for performing a playback with a multimedia system, the method comprising:

requesting the playback of a multimedia source providing multimedia data or of the multimedia data provided by the multimedia source by a user interface, receiving the multimedia data from the multimedia source in response to the requesting, performing the playback using a playback unit by the received multimedia data, automatically extracting at least portions of the playback as tracks, the tracks being characteristic audio parts and video parts of the playback allowing for a unique identification of the playback, sending first data via an Internet from the multimedia system to a remote server, the first data comprising the tracks, identifying, at the remote server, the playback based on the first data to determine identification information, the identification information uniquely identifying the playback, and being determined based on the tracks, and receiving at the multimedia system, in response to the sending, second data comprising the identification information of the playback, wherein the second data further comprises playback control information including operational settings of the playback, performing the playback based on the playback control information, establishing playback properties information indicative of characteristic operational properties of the multimedia system, sending, during the playback, fourth data to the remote server, the fourth data including the playback properties information, and receiving fifth data comprising historical playback statistics corresponding to a plurality of previously established playback properties information.

\* \* \* \* \*